(12) United States Patent
Barrett et al.

(10) Patent No.: US 7,032,023 B1
(45) Date of Patent: Apr. 18, 2006

(54) THROTTLING ELECTRONIC COMMUNICATIONS FROM ONE OR MORE SENDERS

(75) Inventors: Joseph G. Barrett, Oak Hill, VA (US); Mark J. Muehl, Potomac, MD (US); Todd M. Palino, Cambridge, MA (US)

(73) Assignee: America Online, Inc., Dulles, VA (US)

( * ) Notice: Subject to any disclaimer, the term of this patent is extended or adjusted under 35 U.S.C. 154(b) by 484 days.

(21) Appl. No.: 09/876,064

(22) Filed: Jun. 8, 2001

Related U.S. Application Data

(63) Continuation of application No. 09/749,593, filed on Dec. 28, 2000, now abandoned.

(60) Provisional application No. 60/204,574, filed on May 16, 2000.

(51) Int. Cl.
*G06F 15/173* (2006.01)

(52) U.S. Cl. .............. 709/225; 709/203; 709/206; 709/223; 709/224; 709/229; 709/232

(58) Field of Classification Search ........... 709/232, 709/233, 234, 235, 203, 223, 229, 201, 206, 709/224, 225; 455/406; 370/235
See application file for complete search history.

(56) References Cited

U.S. PATENT DOCUMENTS

| | | | |
|---|---|---|---|
| 5,548,533 A * | 8/1996 | Gao et al. ............... | 709/235 |
| 5,634,040 A * | 5/1997 | Her et al. ............... | 345/629 |
| 5,704,047 A * | 12/1997 | Schneeberger ........... | 709/235 |
| 5,742,587 A * | 4/1998 | Zornig et al. ............ | 370/235 |
| 5,862,325 A * | 1/1999 | Reed et al. .............. | 709/201 |
| 5,999,932 A | 12/1999 | Paul | |
| 6,052,709 A | 4/2000 | Paul | |
| 6,088,736 A * | 7/2000 | Manning et al. .......... | 709/234 |
| 6,092,115 A * | 7/2000 | Choudhury et al. ....... | 709/235 |
| 6,167,029 A * | 12/2000 | Ramakrishnan ........... | 370/235 |
| 6,167,434 A * | 12/2000 | Pang ....................... | 709/206 |
| 6,321,267 B1 * | 11/2001 | Donaldson ............... | 709/229 |
| 6,580,790 B1 * | 6/2003 | Henry et al. ........... | 379/201.01 |
| 6,591,301 B1 * | 7/2003 | Li et al. .................. | 709/229 |
| 6,654,787 B1 | 11/2003 | Aronson et al. | |
| 6,701,522 B1 * | 3/2004 | Rubin et al. ............. | 717/178 |

OTHER PUBLICATIONS

Eric Allman, *SENDMAIL™ Installation and Operation Guide Version 8.310 for Sendmail Version 8.10*, Sendmail, Inc., (84 pages).
*Allowing controlled SMTP relaying in Sendmail 8.9*, (2 pages), http://web.archive.org/web/20000510213022/www.sendmail.org/tips/relaying.html.
*Anti-Spam Configuration Control*, (5 pages), http://web.archive.org/web/20000520064211/www.sendmail.org/m4/anti-spam.html.
*Anti-Spam Provisions in Sendmail 8.8*, (4 pages), http://web.archive.org/web/20000510040556/www.sendmail.org/antispam.html.

(Continued)

*Primary Examiner*—Saleh Najjar
*Assistant Examiner*—Michael Y. Won
(74) *Attorney, Agent, or Firm*—Fish & Richardson P.C.

(57) ABSTRACT

A number and/or frequency of electronic data communications received from a sender or group of senders during a period of time may be monitored (e.g., counted). When more than a threshold number of electronic communications are communicated by the sender during the period of time, an ability of the sender to communicate messages may be affected.

21 Claims, 11 Drawing Sheets

OTHER PUBLICATIONS

Mark Durham, *Spam Control in 8.10*, (3 pages), http://web.archive.org/web/20000618042433/sendmail.net/?feed=interview810-5.

Paul Boutin, *RFC 2476: Message Submission Agent*, (3 pages), http://web.archive.org/web/200010270602105/sendmail.net/?feed=rfc2476.

Paul Boutin, *RFC 2554: SMTP Authentication*, (4 pages), http://web.archive.org/web/20001016141928/sendmail.net/?feed=rfc2554.

*Relaying Denied/Allowed (in sendmail 8.8/8.9)*, Last Update Feb. 11, 2000, (2 pages), http://web.archive.org/web/20000418000700/www.sendmail.org/~ca/email/relayingdenied . . . ,.

Rfc2222, J. Myers, *Simple Authentication and Security Layer (SASL)*, (16 pages), Oct. 1997, The Internet Society (1997), http://web.archive.org/web/20001027153713/www.cis.ohio-state.edu/htbin/rfc/rfc2222.ht . . . ,.

Rfc2554, J. Myers, *SMTP Service Extension for Authentication*, (11 pages), Mar. 1999, The Internet Society (1999), http://web.archive.org/web/20001018181229/www.cis.ohio-state.edu/htbin/rfc/rfc2554ht . . . ,.

*Using SMTP AUTH in Sendmail 8.10*, (2 pages), Mar. 27, 2000, http://web.archive.org/web/20001016174022/sendmail.net/?feed=usingsmthpauth.

Godfrey, J., "Instant Spam: It's Tough to Swallow," *Home Office Computing*, [online] vol. 16, No. 11, p.24 [retrieved on Dec. 29, 2004]. Retrieved from <URL: http://proquest.umi.com/pdqweb?index=21&sid=2&srchmode=1&vinst=PROD&fmt=4&startpage . . . >.

* cited by examiner

THROTTLING ELECTRONIC COMMUNICATIONS FROM ONE OR MORE SENDERS

This application claims priority from U.S. Provisional Application No. 60/204,574, filed May 16, 2000, and is a continuation of U.S. application Ser. No. 09/749,593, filed Dec. 28, 2000, now abandoned which are incorporated by reference.

TECHNICAL FIELD

The present invention relates generally to throttling electronic communications from one or more senders.

BACKGROUND

Electronic mail ("E-mail") allows people to communicate with others around the world using the Internet. The growth of the Internet has resulted in an increased amount of "spam" or "junk" e-mail. Spam and junk e-mail includes unsolicited and/or unwelcome e-mail that is sent to Internet users.

SUMMARY

In one general aspect, a number and/or frequency of electronic data communications received from a sender or group of senders during a period of time may be monitored (e.g., counted). When more than a threshold number of electronic communications are communicated by the sender or group of senders during the period of time, and ability of that sender or group of senders to communicate messages may be affected.

Implementations may include one or more of the following features. For example, monitoring communications may include counting a number of electronic communications communicated by the sender that require concurrently open connections. Affecting the ability of the sender to communicate may include terminating at least one connection when the sender communicates more than the threshold number of electronic communications requiring concurrently open connections during the period of time. The sender may include more than one electronic communication generating machine, and the period of time may be configurable. In addition, the electronic communication may be received at an intermediary located between a sender and an intended recipient of the electronic communication. The sender may be identified at the intermediary and the electronic communication may be changed to reflect information identifying the sender that is collected at the intermediary. The number of electronic communications communicated by a sender may be counted based on the information identifying the sender, as reflected by the changed electronic communication. At least one connection of the sender may be terminated when more than the threshold number of electronic communications are communicated by the sender during the period of time.

These features may be implemented using, for example, a method or a process, a device, an apparatus or a system, or software stored on a computer medium.

DETAILED DESCRIPTION

For illustrative purposes, FIGS. 1–6 describe a communications system for implementing techniques for transferring information (e.g., files) between subscribers of a host complex. For brevity, several elements in the figures described below are represented as monolithic entities. However, as would be understood by one skilled in the art, these elements each may include numerous interconnected computers and components designed to perform a set of specified operations and/or dedicated to a particular geographical region.

Figure 1:
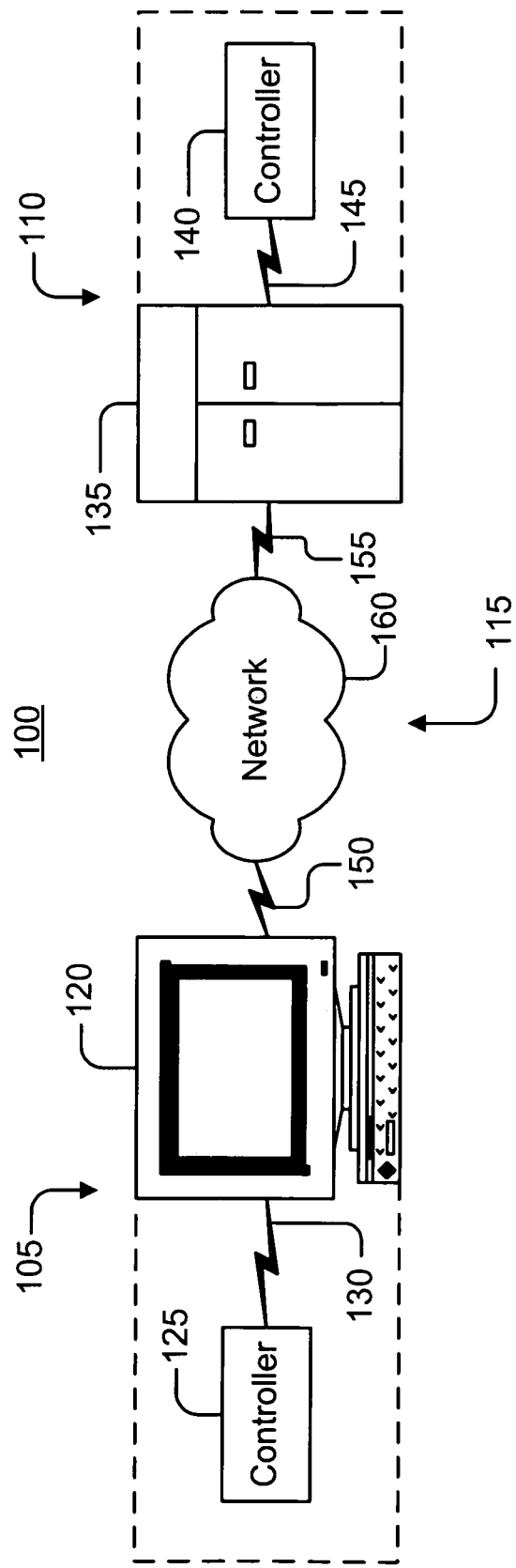
FIG. 1 is a block diagram of a communications system.

Referring to FIG. 1, a communications system 100 is capable of delivering and exchanging data between a client system 105 and a host system 110 through a communications link 115. The client system 105 typically includes one or more client devices 120 and/or client controllers 125, and the host system 110 typically includes one or more host devices 135 and/or host controllers 140. For example, the client system 105 or the host system 110 may include one or more general-purpose computers (e.g., personal computers), one or more special-purpose computers (e.g., devices specifically programmed to communicate with each other and/or the client system 105 or the host system 110), or a combination of one or more general-purpose computers and one or more special-purpose computers. The client system 105 and the host system 110 may be arranged to operate within or in concert with one or more other systems, such as, for example, one or more LANs ("Local Area Networks") and/or one or more WANs ("Wide Area Networks").

The client device 120 (or the host controller 135) is generally capable of executing instructions under the command of a client controller 125 (or a host controller 140). The client device 120 (or the host device 135) is connected to the client controller 125 (or the host controller 140) by a wired or wireless data pathway 130 or 145 capable of delivering data.

The client device 120, the client controller 125, the host device 135, and the host controller 140 each typically includes one or more hardware components and/or software components. An example of a client device 120 or a host device 135 is a general-purpose computer (e.g., a personal computer) capable of responding to and executing instructions in a defined manner. Other examples include a special-purpose computer, a workstation, a server, a device, a component, other physical or virtual equipment or some combination thereof capable of responding to and executing instructions.

An example of client controller 125 or a host controller 140 is a software application loaded on the client device 120 or the host device 135 for commanding and directing communications enabled by the client device 120 or the host device 135. Other examples include a program, a piece of code, an instruction, a device, a computer, a computer system, or a combination thereof, for independently or collectively instructing the client device 120 or the host device 135 to interact and operate as described. The client controller 125 and the host controller 140 may be embodied permanently or temporarily in any type of machine, component, physical or virtual equipment, storage medium, or propagated signal capable of providing instructions to the client device 120 or the host device 135.

The communications link 115 typically includes a delivery network 160 making a direct or indirect communication between the client system 105 and the host system 110, irrespective of physical separation. Examples of a delivery network 160 include the Internet, the World Wide Web, WANs, LANs, analog or digital wired and wireless telephone networks (e.g. PSTN, ISDN, and xDSL), radio, television, cable, satellite, and/or any other delivery mechanism for carrying data. The communications link 115 may include communication pathways 150, 155 that enable communications through the one or more delivery networks 160 described above. Each of the communication pathways 150, 155 may include, for example, a wired, wireless, cable or satellite communication pathway.

Figure 2:
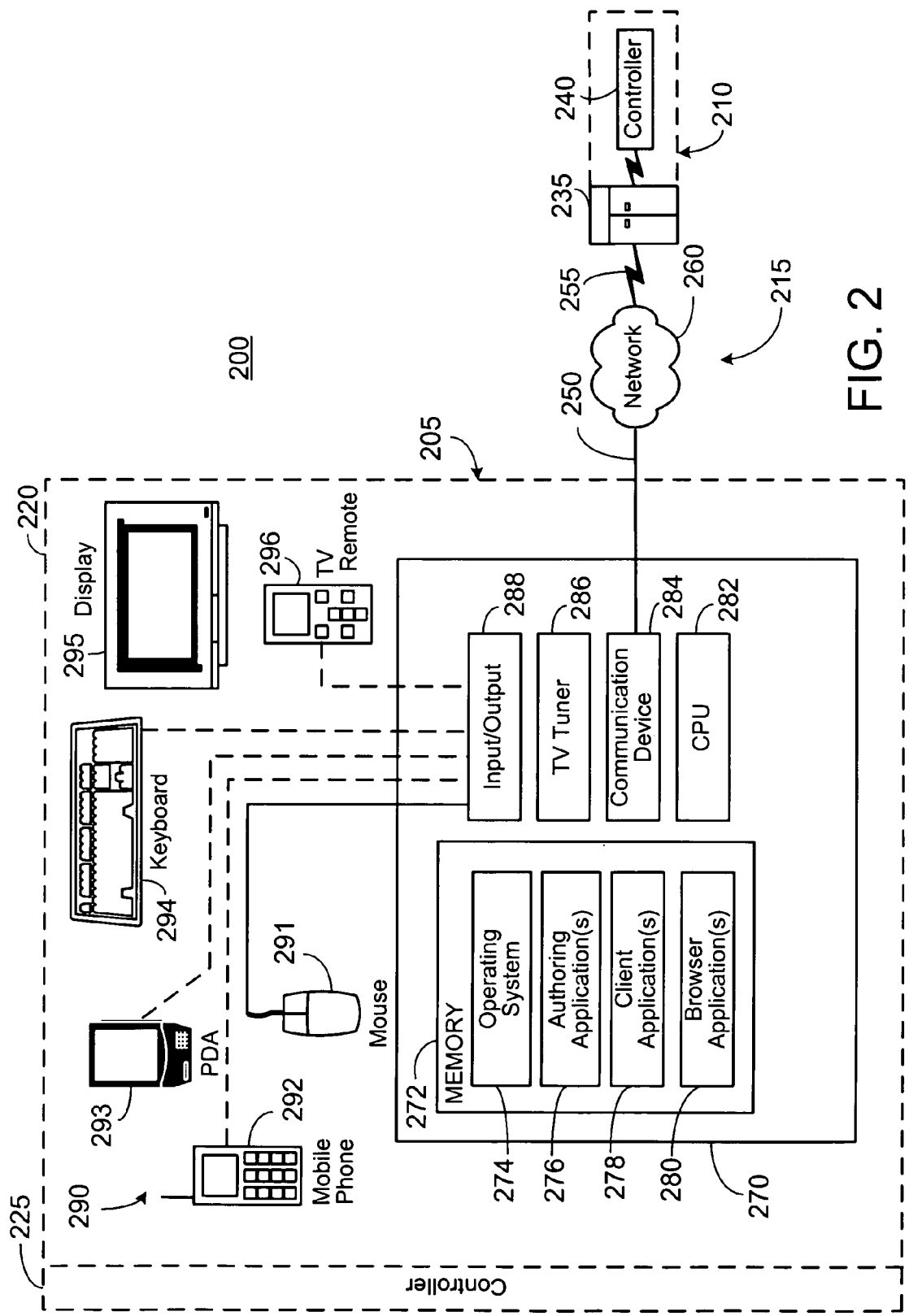
FIGS. 2–6 are expansions of the block diagram of FIG. 1.

FIG. 2 illustrates a communication system 200 including a client system 205 communicating with a host system 210 through a communications link 215. Client system 205 typically includes one or more client devices 220 and one or more client controllers 225 for controlling the client devices 220. Host system 210 typically includes one or more host devices 235 and one or more host controllers 240 for controlling the host devices 235. The communications link 215 may include communication pathways 250, 255 enabling communications through the one or more delivery networks 260.

Examples of each element within the communication system of FIG. 2 are broadly described above with respect to FIG. 1. In particular, the host system 210 and the communications link 215 typically have attributes comparable to those described with respect to the host system 110 and the communications link 115 of FIG. 1, respectively. Likewise, the client system 205 of FIG. 2 typically has attributes comparable to and may illustrate one possible implementation of the client system 105 of FIG. 1.

The client device 220 typically includes a general purpose computer 270 having an internal or external storage 272 for storing data and programs such as an operating system 274 (e.g., DOS, Windows™, Windows 95™, Windows 98™, Windows 2000™, Windows NT™, OS/2, and Linux) and one or more application programs. Examples of application programs include authoring applications 276 (e.g., word processing, database programs, spreadsheet programs, and graphics programs) capable of generating documents or other electronic content; client applications 278 (e.g., AOL client, CompuServe client, AIM client, AOL TV client, and ISP client) capable of communicating with other computer users, accessing various computer resources, and viewing, creating, or otherwise manipulating electronic content; and browser applications 280 (e.g., Netscape's Navigator and Microsoft's Internet Explorer) capable of rendering standard Internet content.

The general-purpose computer 270 also includes a central processing unit 282 (CPU) for executing instructions in response to commands from the client controller 225. In one implementation, the client controller 225 includes one or more of the application programs installed on the internal or external storage 272 of the general-purpose computer 270. In another implementation, the client controller 225 includes application programs externally stored in and executed by one or more device(s) external to the general-purpose computer 270.

The general-purpose computer typically will include a communication device 284 for sending and receiving data. One example of the communication device 284 is a modem. Other examples include a transceiver, a set-top box, a communication card, a satellite dish, an antenna, or another network adapter capable of transmitting and receiving data over the communications link 215 through a wired or wireless data pathway 250. The general-purpose computer 270 also may include a TV ("television") tuner 286 for receiving television programming in the form of broadcast, satellite, and/or cable TV signals. As a result, the client device 220 can selectively and/or simultaneously display network content received by communications device 284 and television programming content received by the TV tuner 286.

The general-purpose computer 270 typically will include an input/output interface 288 to enable a wired or wireless connection to various peripheral devices 290. Examples of peripheral devices 290 include, but are not limited to, a mouse 291, a mobile phone 292, a personal digital assistant 293 (PDA), a keyboard 294, a display monitor 295 with or without a touch screen input, and/or a TV remote control 296 for receiving information from and rendering information to subscribers. Other examples may include voice recognition and synthesis devices.

Although FIG. 2 illustrates devices such as a mobile telephone 292, a PDA 293, and a TV remote control 296 as being peripheral to the general-purpose computer 270, in another implementation, such devices may themselves include the functionality of the general-purpose computer 270 and operate as the client device 220. For example, the mobile phone 292 or the PDA 293 may include computing and networking capabilities, and may function as a client device 220 by accessing the delivery network 260 and communicating with the host system 210. Furthermore, the client system 205 may include one, some or all of the components and devices described above.

Figure 3:
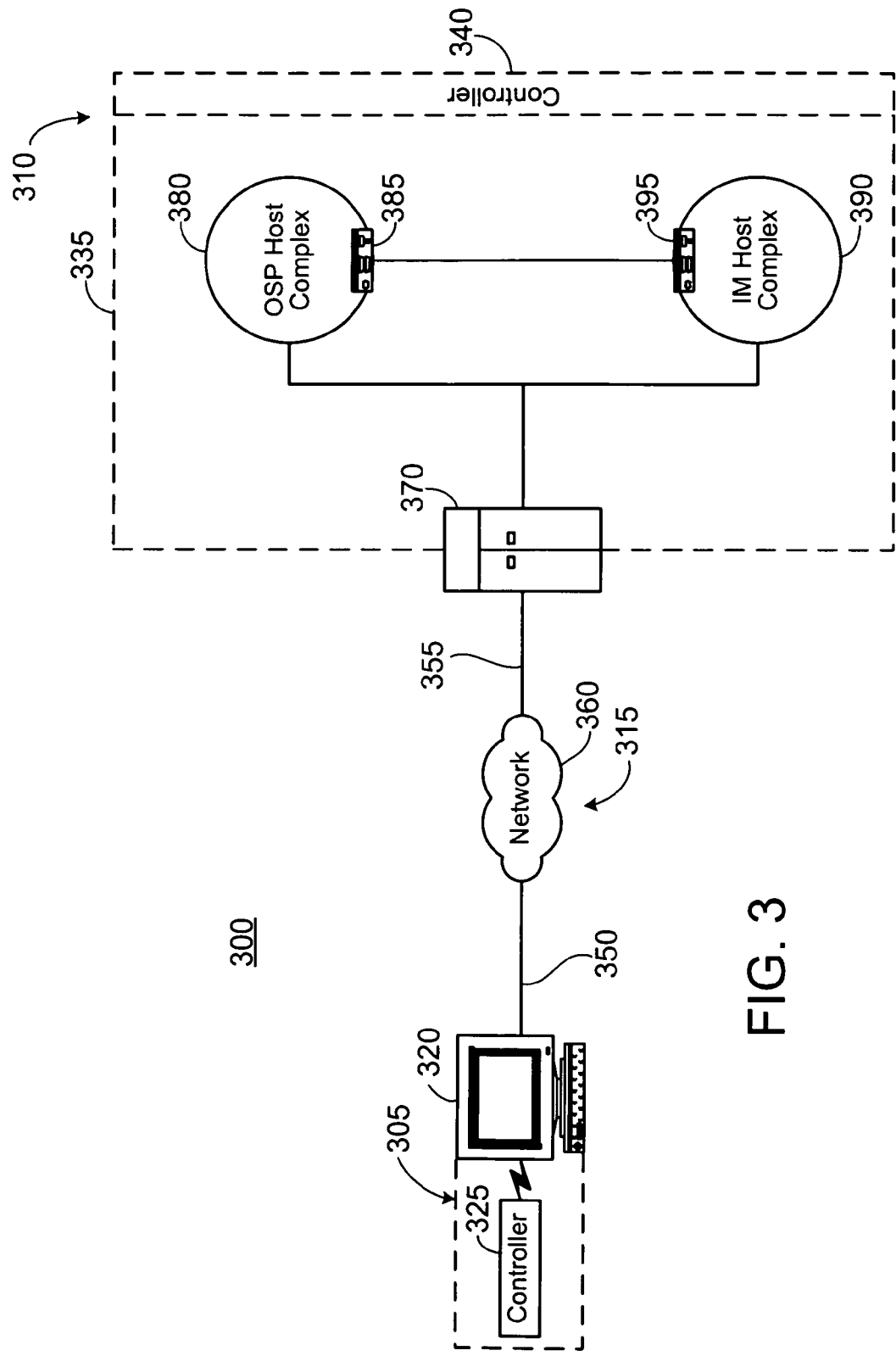

Referring to FIG. 3, a communications system 300 is capable of delivering and exchanging information between a client system 305 and a host system 310 through a communication link 315. Client system 305 typically includes one or more client devices 320 and one or more client controllers 325 for controlling the client devices 320. Host system 310 typically includes one or more host devices 335 and one or more host controllers 340 for controlling the host devices 335. The communications link 315 may include communication pathways 350, 355 enabling communications through the one or more delivery networks 360.

Examples of each element within the communication system of FIG. 3 are broadly described above with respect to FIGS. 1 and 2. In particular, the client system 305 and the communications link 315 typically have attributes comparable to those described with respect to client systems 105 and 205 and communications links 115 and 215 of FIGS. 1 and 2. Likewise, the host system 310 of FIG. 3 may have attributes comparable to and may illustrate one possible implementation of the host systems 110 and 210 shown in FIGS. 1 and 2.

The host system 310 includes a host device 335 and a host controller 340. The host controller 340 is generally capable of transmitting instructions to any or all of the elements of the host device 335. For example, in one implementation, the host controller 340 includes one or more software applications loaded on the host device 335. However, in other implementations, as described above, the host controller 340 may include any of several other programs, machines, and devices operating independently or collectively to control the host device 335.

The host device 335 includes a login server 370 for enabling access by subscribers and routing communications between the client system 305 and other elements of the host device 335. The host device 335 also includes various host complexes such as the depicted OSP ("Online Service Provider") host complex 380 and IM ("Instant Messaging") host complex 390. To enable access to these host complexes by subscribers, the client system 305 may include communication software, for example, an OSP client application and an IM client application. The OSP and IM communication software applications are designed to facilitate the subscriber's interactions with the respective services and, in particular, may provide access to all the services available within the respective host complexes. For example, Instant Messaging allows a subscriber to use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

Typically, the OSP host complex 380 supports different services, such as email, discussion groups, chat, news services, and Internet access. The OSP host complex 380 is generally designed with an architecture that enables the machines within the OSP host complex 380 to communicate with each other, certain protocols (i.e., standards, formats, conventions, rules, and structures) being employed to enable the transfer of data. The OSP host complex 380 ordinarily employs one or more OSP protocols and custom dialing engines to enable access by selected client applications. The OSP host complex 380 may define one or more specific protocols for each service based on a common, underlying proprietary protocol.

The IM host complex 390 is generally independent of the OSP host complex 380, and supports instant messaging services irrespective of a subscriber's network or Internet access. Thus, the IM host complex 390 allows subscribers to send and receive instant messages, whether or not they have access to any particular ISP. The IM host complex 390 may support associated services, such as administrative matters, advertising, directory services, chat, and interest groups related to the instant messaging. The IM host complex 390 has an architecture that enables all of the machines within the IM host complex to communicate with each other. To transfer data, the IM host complex 390 employs one or more standard or exclusive IM protocols.

The host device 335 may include one or more gateways that connect and therefore link complexes, such as the OSP host complex gateway 385 and the IM host complex gateway 395. The OSP host complex gateway 385 and the IM host complex 395 gateway may directly or indirectly link the OSP host complex 380 with the IM host complex 390 through a wired or wireless pathway. Ordinarily, when used to facilitate a link between complexes, the OSP host complex gateway 385 and the IM host complex gateway 395 are privy to information regarding a protocol anticipated by a destination complex, which enables any necessary protocol conversion to be performed incident to the transfer of data from one complex to another. For instance, the OSP host complex 380 and IM host complex 390 may use different protocols such that transferring data between the complexes requires protocol conversion by or at the request of the OSP host complex gateway 385 and/or the IM host complex gateway 395.

Figure 4:
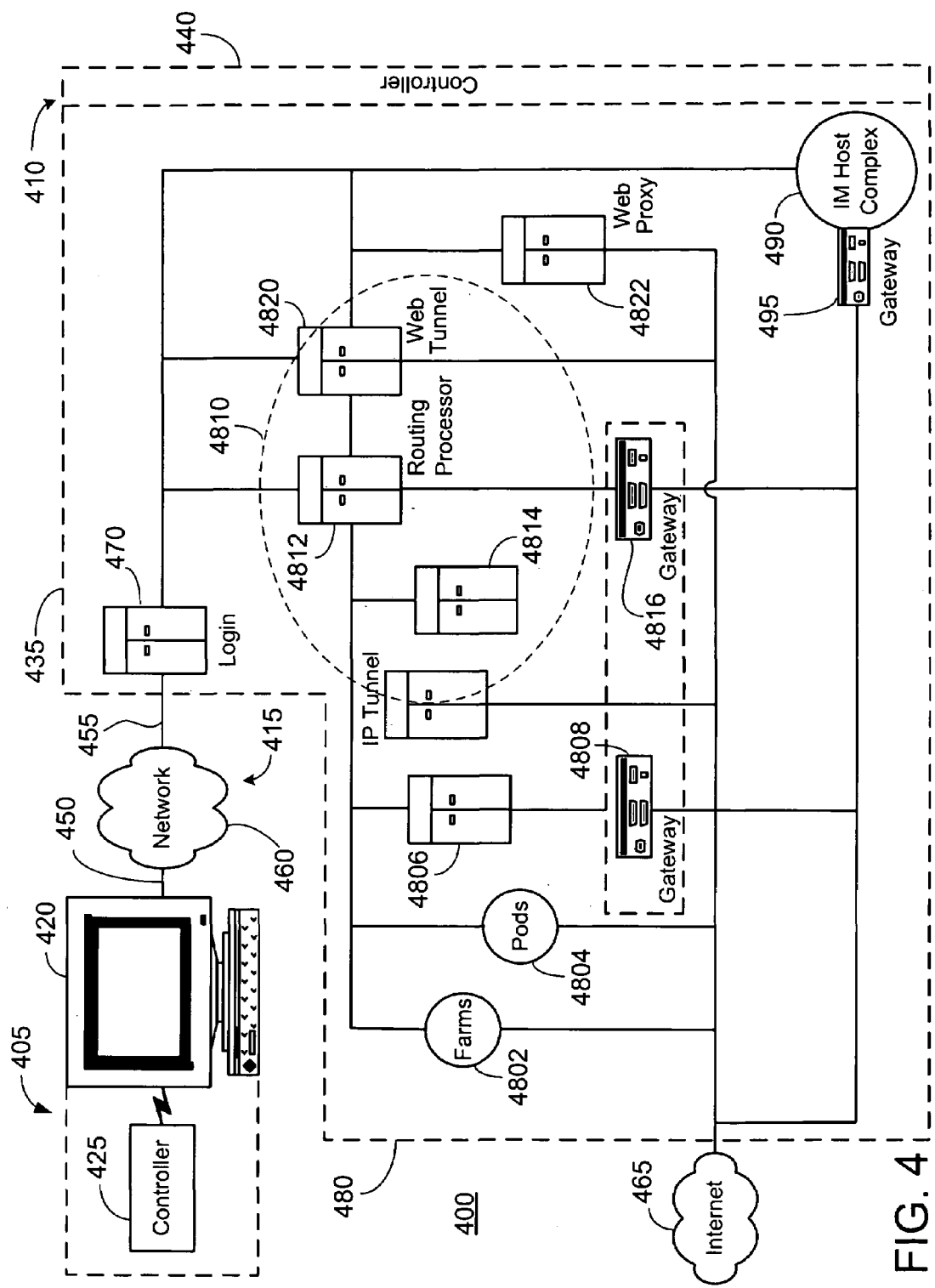

Referring to FIG. 4, a communications system 400 is capable of delivering and exchanging information between a client system 405 and a host system 410 through a communication link 415. Client system 405 typically includes one or more client devices 420 and one or more client controllers 425 for controlling the client devices 420. Host system 410 typically includes one or more host devices 435 and one or more host controllers 440 for controlling the host devices 435. The communications link 415 may include communication pathways 450, 455 enabling communications through the one or more delivery networks 460. As shown, the client system 405 may access the Internet 465 through the host system 410.

Examples of each element within the communication system of FIG. 4 are broadly described above with respect to FIGS. 1–3. In particular, the client system 405 and the communications link 415 typically have attributes comparable to those described with respect to client systems 105, 205, and 305 and communications links 115, 215, and 315 of FIGS. 1–3. Likewise, the host system 410 of FIG. 4 may have attributes comparable to and may illustrate one possible implementation of the host systems 110, 210, and 310 shown in FIGS. 1–3. FIG. 4 describes an aspect of the host system 410, focusing primarily on one particular implementation of OSP host complex 480.

The client system 405 includes a client device 420 and a client controller 425. The client controller 425 is generally capable of establishing a connection to the host system 410, including the OSP host complex 480, the IM host complex 490 and/or the Internet 465. In one implementation, the client controller 425 includes an OSP application for communicating with servers in the OSP host complex 480 using OSP protocols that may or may not be exclusive or proprietary. The client controller 425 also may include applications, such as an IM client application and/or an Internet browser application, for communicating with the IM host complex 490 and the Internet 465.

The host system 410 includes a host device 435 and a host controller 440. The host controller 440 is generally capable of transmitting instructions to any or all of the elements of the host device 435. For example, in one implementation, the host controller 440 includes one or more software applications loaded on one or more elements of the host device 435. In other implementations, as described above, the host controller 440 may include any of several other programs, machines, and devices operating independently or collectively to control the host device 435.

The host device 435 includes a login server 470 capable of enabling communications between client systems 405 and various elements of the host system 410, including elements such as OSP host complex 480 and IM host complex 490. The login server 470 may implement one or more authorization procedures to enable simultaneous access to one or more of these elements.

The OSP host complex 480 and the IM host complex 490 are typically connected through one or more OSP host complex gateways 485 and one or more IM host complex gateways 495. Each OSP host complex gateway 485 and IM host complex gateway 495 may generally perform protocol conversions necessary to enable communication between one or more of the OSP host complex 480, the IM host complex 490, and the Internet 465.

The OSP host complex 480 supports a set of services to be accessed through and/or performed by from one or more servers located internal to and external from the OSP host complex 480. Servers external to the OSP host complex 480 may communicate using the Internet 465. Servers internal to the OSP complex 480 may be arranged in one or more configurations. For example, servers may be arranged in large centralized clusters identified as farms 4802 or in localized clusters identified as pods 4804.

More specifically, farms 4802 are groups of servers located at centralized locations within the OSP host complex 480. Farms 4802 generally are dedicated to providing particular functionality and services to subscribers and clients from a centralized location, regardless of the location of the subscriber or client. Farms 4802 are particularly useful for providing services that depend upon other remotely-located or performed processes and services for information, such as, for example, chat, email, instant messaging, news, newsgroups, search, stock updates, and weather. Thus, farms 4802 tend to rely on connections with external resources such as the Internet 465 and/or other servers within the OSP host complex 480.

By contrast to farms 4802, pods 4804 are clusters of localized servers that provide some services offered by the OSP host complex 480 from a location local to the service or information recipient, which reduces and avoids time delays and congestion inherent in centralized processing. Each pod 4804 includes one or more interrelated servers capable of operating together to provide one or more services offered by the OSP host complex 480 in a geographically localized manner, with the servers of a pod 4804 generally operating independently of resources external to the pod 4804. A pod 4804 may cache content received from external sources, such as farms 4802 or the Internet 465, making frequently requested information readily available to the local service or information recipients served by the pod 4804. In this way, pods 4804 are particularly useful in providing services that are independent of other processes and servers such as, for example, routing to other localized resources or recipients, providing access to keywords and geographically specific content, providing access to routinely accessed information, and downloading certain software and graphical interface updates with reduced processing time and congestion. The determination of which servers and processes are located in the pod 4804 is made by the OSP according to load distribution, frequency of requests, demographics, and other factors.

In addition to farms 4802 and pods 4804, the implementation of FIG. 4 also includes one or more non-podded and non-farmed servers 4806. In general, the servers 4806 may be dedicated to performing a particular service or information that relies on other processes and services for information and may be directly or indirectly connected to resources outside of the OSP host complex 480, such as the Internet 465 and the IM host complex 490, through an OSP gateway 4808 within OSP host complex gateway 485. In the event that subscriber usage of a particular service or information of the servers 4806 becomes relatively high, those servers 4806 may be integrated into a farm or pod, as appropriate.

In the implementation of FIG. 4, one particular exemplary pod 4810 is shown in more detail. Pod 4810 includes a routing processor 4812. In a packet-based implementation, the client system 405 may generate information requests, convert the requests into data packets, sequence the data packets, perform error checking and other packet-switching techniques, and transmit the data packets to the routing processor 4812. Upon receiving data packets from the client system 405, the routing processor 4812 may directly or indirectly route the data packets to a specified destination within or outside of the OSP host complex 480. In general, the routing processor 4812 will examine an address field of a data request, use a mapping table to determine the appropriate destination for the data request, and direct the data request to the appropriate destination.

For example, in the event that a data request from the client system 405 can be satisfied locally, the routing processor 4812 may direct the data request to a local server 4814 in the pod 4810. In the event that the data request cannot be satisfied locally, the routing processor 4812 may direct the data request internally to one or more farms 4802, one or more other pods 4804, or one or more non-podded servers 4806 in the OSP host complex 480, or the routing processor 4812 may direct the data request externally to elements such as the IM host complex 490 through an OSP/pod gateway 4816.

The routing processor 4812 also may direct data requests and/or otherwise facilitate communication between the client system 405 and the Internet 465 through the OSP/pod gateway 4816. In one implementation, the client system 405 uses an OSP client application to convert standard Internet content and protocols into OSP protocols and vice versa, where necessary. For example, when a browser application transmits a request in a standard Internet protocol, the OSP client application can intercept the request, convert the request into an OSP protocol and send the converted request to the routing processor 4812 in the OSP host complex 480. The routing processor 4812 recognizes the Internet 465 as the destination and routes the data packets to an IP ("Internet Protocol") tunnel 4818. The IP tunnel 4818 converts the data from the OSP protocol back into standard Internet protocol and transmits the data to the Internet 465. The IP tunnel 4818 also converts the data received from the Internet in the standard Internet protocol back into the OSP protocol and sends the data to the routing processor 4812 for delivery back to the client system 405. At the client system 405, the OSP client application converts the data in the OSP protocol back into standard Internet content for communication with the browser application.

The IP tunnel 4818 may act as a buffer between the client system 405 and the Internet 465, and may implement content filtering and time saving techniques. For example, the IP tunnel 4818 can check parental controls settings of the client system 405 and request and transmit content from the Internet 465 according to the parental control settings. In addition, the IP tunnel 4818 may include a number a caches for storing frequently accessed information. If requested data is determined to be stored in the caches, the IP tunnel 4818 may send the information to the client system 405 from the caches and avoid the need to access the Internet 465.

In another implementation, the client system 405 may use standard Internet protocols and formatting to access pods 4810 and the Internet 465. For example, the subscriber can use an OSP TV client application having an embedded browser application installed on the client system 405 to generate a request in standard Internet protocol, such as HTTP ("HyperText Transport Protocol"). In a packet-based implementation, data packets may be encapsulated inside a standard Internet tunneling protocol, such as, for example, UDP ("User Datagram Protocol"), and routed to a web tunnel 41010. The web tunnel 41010 may be a L2TP ("Layer Two Tunneling Protocol") tunnel capable of establishing a point-to-point protocol (PPP) session with the client system 405. The web tunnel 41010 provides a gateway to the routing processor 4812 within the pod 4810, the Internet 465, and a web proxy 4822.

The web proxy 4822 can look up subscriber information from the IP address of the client system 405 to determine demographic information such as the subscriber's parental control settings. In this way, the web proxy 4822 can tailor the subscriber's content and user interfaces. The web proxy 4822 can also perform caching functions to store certain URLs ("Uniform Resource Locators") and other electronic content so that the web proxy 4822 can locally deliver information to the client system 405 and avoid the need to access the Internet 465 in the event that data requested by the client system 405 has been cached.

Figure 5:
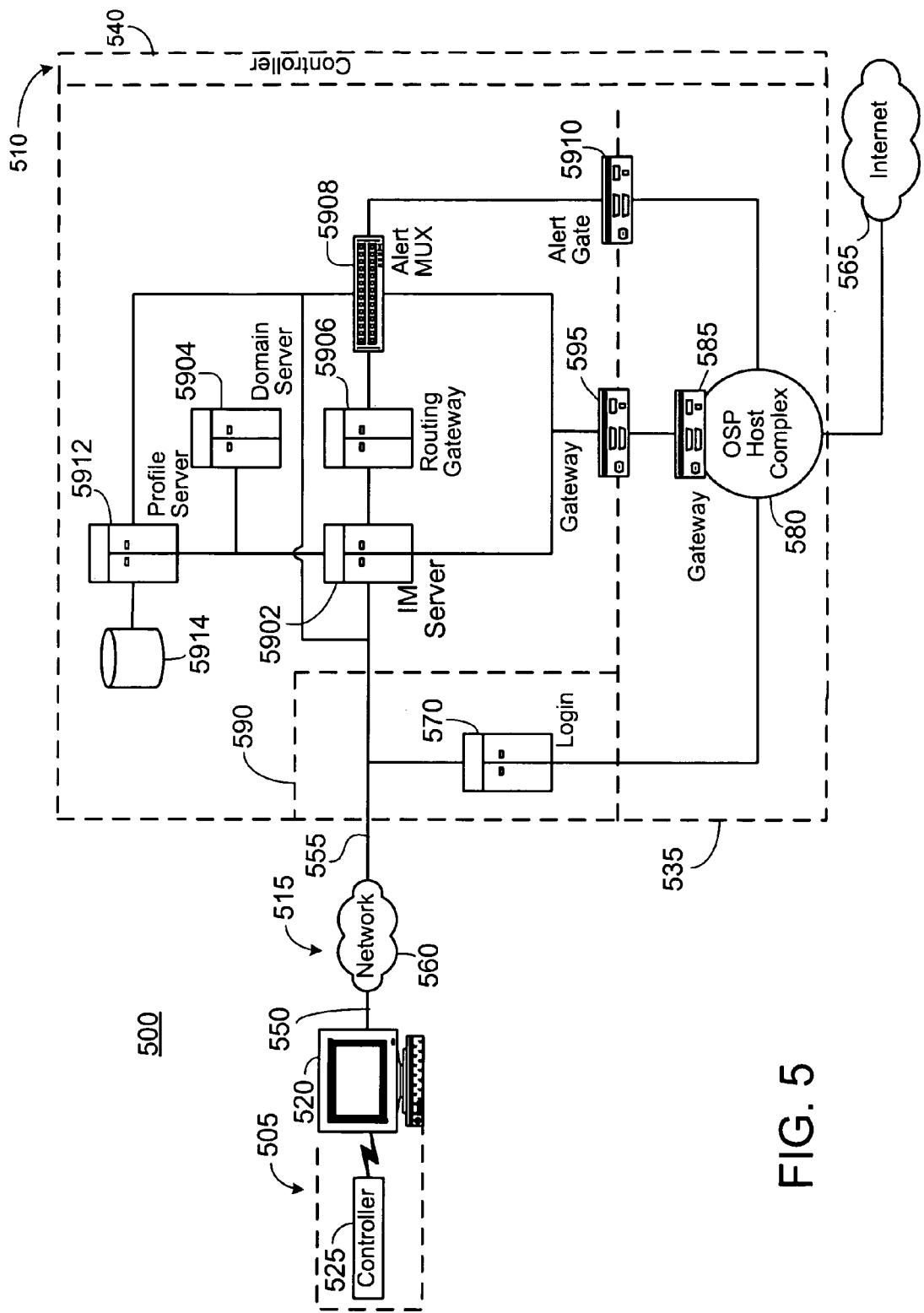

Referring to FIG. 5, a communications system 500 is capable of delivering and exchanging information between a client system 505 and a host system 510 through a communication link 515. Client system 505 typically includes one or more client devices 520 and one or more client controllers 525 for controlling the client devices 520. Host system 510 typically includes one or more host devices 535 and one or more host controllers 540 for controlling the host devices 535. The communications link 515 may include communication pathways 550, 555 enabling communications through the one or more delivery networks 560. As shown, the client system 505 may access the Internet 565 through the host system 510.

Examples of each element within the communication system of FIG. 5 are broadly described above with respect to FIGS. 1–4. In particular, the client system 505 and the communications link 515 typically have attributes comparable to those described with respect to client systems 105, 205, 305, and 405 and communications links 115, 215, 315, and 415 of FIGS. 1–4. Likewise, the host system 510 of FIG. 5 may have attributes comparable to and may illustrate one possible implementation of the host systems 110, 210, 310, and 410 shown in FIGS. 1–4. FIG. 5 describes an aspect of the host system 510, focusing primarily on one particular implementation of IM host complex 590.

The client system 505 includes a client device 520 and a client controller 525. The client controller 525 is generally capable of establishing a connection to the host system 510, including the OSP host complex 580, the IM host complex 590 and/or the Internet 565. In one implementation, the client controller 525 includes an IM application for communicating with servers in the IM host complex 590 utilizing exclusive IM protocols. The client controller 525 also may include applications, such as an OSP client application and/or an Internet browser application, for communicating with elements such as the OSP host complex 580 and the Internet 565.

The host system 510 includes a host device 535 and a host controller 540. The host controller 540 is generally capable of transmitting instructions to any or all of the elements of the host device 535. For example, in one implementation, the host controller 540 includes one or more software applications loaded on one or more elements of the host device 535. In other implementations, as described above, the host controller 540 may include any of several other programs, machines, and devices operating independently or collectively to control the host device 535.

The host system 510 includes a login server 570 capable of enabling communications between client systems 505 and various elements of the host system 510, including elements such as the OSP host complex 580 and IM host complex 590; login server 570 is also capable of authorizing access by the client system 505 and those elements. The login server 570 may implement one or more authorization procedures to enable simultaneous access to one or more of the elements. The OSP host complex 580 and the IM host complex 590 are connected through one or more host complex gateways 585 and one or more IM host complex gateways 595. Each OSP host complex gateway 585 and IM host complex gateway 595 may perform any protocol conversions necessary to enable communication between the OSP host complex 580, the IM host complex 590, and the Internet 565.

To access the IM host complex 590 to begin an instant messaging session, the client system 505 establishes a connection to the login server 570. The login server 570 typically determines whether the particular subscriber is authorized to access the IM host complex 590 by verifying a subscriber identification and password. If the subscriber is authorized to access the IM host complex 590, the login server 570 employs a hashing technique on the subscriber's screen name to identify a particular IM server 5902 for use during the subscriber's session. The login server 570 provides the client system 505 with the IP address of the particular IM server 5902, gives the client system 505 an encrypted key (i.e., a cookie), and breaks the connection. The client system 505 then uses the IP address to establish a connection to the particular IM server 5902 through the communications link 515, and obtains access to that IM server 5902 using the encrypted key. Typically, the client system 505 will be equipped with a winsock API ("Application Programming Interface") that enables the client system 505 to establish an open TCP connection to the IM server 5902.

Once a connection to the IM server 5902 has been established, the client system 505 may directly or indirectly transmit data to and access content from the IM server 5902 and one or more associated domain servers 5904. The IM server 5902 supports the fundamental instant messaging services and the domain servers 5904 may support associated services, such as, for example, administrative matters, directory services, chat and interest groups. The domain servers 5904 can be used to lighten the load placed on the IM server 5902 by assuming responsibility for some of the services within the IM host complex 590. By accessing the IM server 5902 and/or the domain server 5904, a subscriber can use the IM client application to view whether particular subscribers ("buddies") are online, exchange instant messages with particular subscribers, participate in group chat rooms, trade files such as pictures, invitations or documents, find other subscribers with similar interests, get customized news and stock quotes, and search the Web.

In the implementation of FIG. 5, IM server 5902 is directly or indirectly connected to a routing gateway 5906. The routing gateway 5906 facilitates the connection between the IM server 5902 and one or more alert multiplexors 5908. For example, routing gateway 5906 may serve as a link minimization tool or hub to connect several IM servers 5902 to several alert multiplexors 5908. In general, an alert multiplexor 5908 maintains a record of alerts and subscribers registered to receive the alerts.

Once the client system 505 is connected to the alert multiplexor 5908, a subscriber can register for and/or receive one or more types of alerts. The connection pathway between the client system 505 and the alert multiplexor 5908 is determined by employing a hashing technique at the IM server 5902 to identify the particular alert multiplexor 5908 to be used for the subscriber's session. Once the particular multiplexor 5908 has been identified, the IM server 5902 provides the client system 505 with the IP address of the particular alert multiplexor 5908 and gives the client system 505 an encrypted key (i.e., a cookie) used to gain access to the identified multiplexor 5908. The client system 505 then uses the IP address to connect to the particular alert multiplexor 5908 through the communication link 515 and obtains access to the alert multiplexor 5908 using the encrypted key.

The alert multiplexor 5908 is connected to an alert gate 5910 that, like the IM host complex gateway 595, is capable of performing the necessary protocol conversions to enable communication with the OSP host complex 580. The alert gate 5910 is the interface between the IM host complex 590 and the physical servers, such as servers in the OSP host complex 580, where state changes are occurring. In general, the information regarding state changes will be gathered and used by the IM host complex 590. The alert multiplexor 5908 also may communicate with the OSP host complex 580 through the IM gateway 595, for example, to provide the servers and subscribers of the OSP host complex 580 with certain information gathered from the alert gate 5910.

The alert gate 5910 can detect an alert feed corresponding to a particular type of alert. The alert gate 5910 may include a piece of code (alert receive code) capable of interacting with another piece of code (alert broadcast code) on the physical server where a state change occurs. In general, the alert receive code installed on the alert gate 5910 instructs the alert broadcast code installed on the physical server to send an alert feed to the alert gate 5910 upon the occurrence of a particular state change. Thereafter, upon detecting an alert feed, the alert gate 5910 contacts the alert multiplexor 5908, which in turn, informs the appropriate client system 505 of the detected alert feed.

In the implementation of FIG. 5, the IM host complex 590 also includes a subscriber profile server 5912 connected to a database 5914 for storing large amounts of subscriber profile data. The subscriber profile server 5912 may be used to enter, retrieve, edit, manipulate, or otherwise process subscriber profile data. In one implementation, a subscriber's profile data includes, for example, the subscriber's buddy list, alert preferences, designated stocks, identified interests, geographic location and other demographic data. The subscriber may enter, edit and/or delete profile data using an installed IM client application on the client system 505 to interact with the subscriber profile server 5912.

Because the subscriber's data is stored in the IM host complex 590, the subscriber does not have to reenter or update such information in the event that the subscriber accesses the IM host complex 590 using a new or different client system 505. Accordingly, when a subscriber accesses the IM host complex 590, the IM server 5902 can instruct the subscriber profile server 5912 to retrieve the subscriber's profile data from the database 5914 and to provide, for example, the subscriber's buddy list to the IM server 5902 and the subscriber's alert preferences to the alert multiplexor 5908. The subscriber profile server 5912 also may communicate with other servers in the OSP host complex 590 to share subscriber profile data with other services. Alternatively, user profile data may be saved locally on the client device 505.

Figure 6:
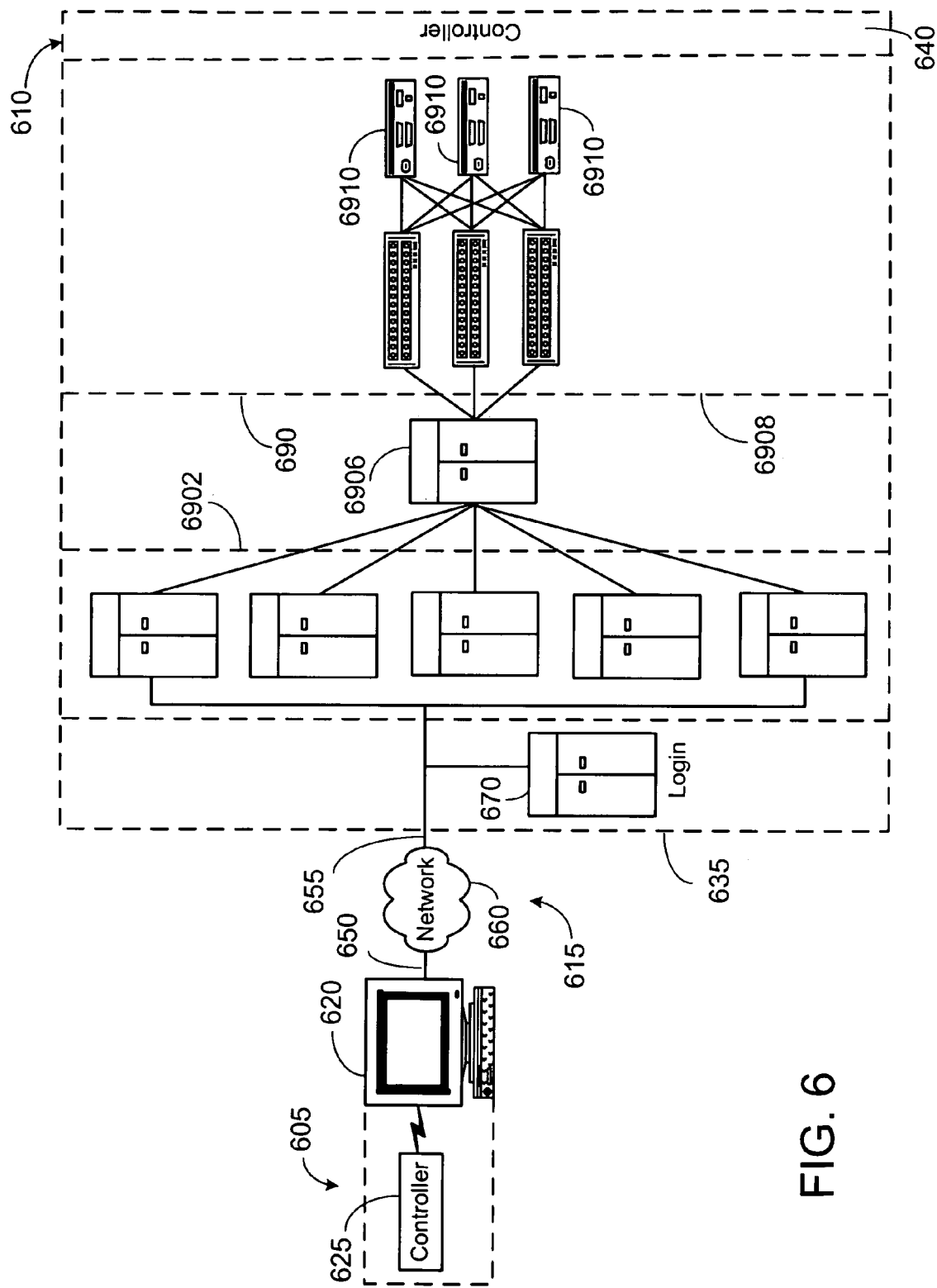

Referring to FIG. 6, a communications system 600 is capable of delivering and exchanging information between a client system 605 and a host system 610 through a communication link 615. Client system 605 typically includes one or more client devices 620 and one or more client controllers 625 for controlling the client devices 620. Host system 610 typically includes one or more host devices 635 and one or more host controllers 640 for controlling the host devices 635. The communications link 615 may include communication pathways 650, 655 enabling communications through the one or more delivery networks 660.

Examples of each element within the communication system of FIG. 6 are broadly described above with respect to FIGS. 1–5. In particular, the client system 605 and the communications link 615 typically have attributes comparable to those described with respect to client systems 105, 205, 305, 405 and 505 and communications links 115, 215, 315, 415 and 515 of FIGS. 1–5. Likewise, the host system 610 of FIG. 6 may have attributes comparable to and may illustrate one possible implementation of the host systems 110, 210, 310, 410 and 510 shown in FIGS. 1–5. FIG. 6 describes several aspects of one implementation of the host system 610 in greater detail, focusing primarily on one particular implementation of the login server 670 and IM host complex 690.

The client system 605 includes a client device 620 and a client controller 625. The client controller 625 is generally capable of establishing a connection to the host system 610, including the IM host complex 690. In one implementation, the client controller 625 includes an IM application for communicating with servers in the IM host complex 690 utilizing exclusive IM protocols.

The host system 610 includes a host device 635 and a host controller 640. The host controller 640 is generally capable of transmitting instructions to any or all of the elements of the host device 635. For example, in one implementation, the host controller 640 includes one or more software applications loaded on one or more elements of the host device 635. In other implementations, as described above, the host controller 640 may include any of several other programs, machines, and devices operating independently or collectively to control the host device 635.

The host system 610 includes a login server 670 capable of enabling communications between client systems 605 and various elements of the host system 610, including elements such as the IM host complex 690 and the OSP host complex 680; login server 670 is also capable of authorizing access by the client system 605 and those elements. The IM host complex 690 includes an IM server network 6902, a routing gateway 6906, an alert multiplexor network 6908, and one or more alert gates 6910. The IM server network 6902 may include an interconnected network of IM servers and the alert multiplexor network 6908 may include an interconnected network of alert multiplexors. In the implementation of FIG. 6, the IM server network 6902 and the alert multiplexor network 6908 are interconnected by a routing gateway 6906 that serves as a common hub to reduce the number of connections. Each IM server within IM server network 6902 can directly or indirectly communicate and exchange information with one or more of the alert multiplexors in the alert multiplexor network 6908. Each of the alert multiplexors in the alert multiplexor network 6908 may be connected to several alert gates 6910 that receive different types of alerts.

During a session, a subscriber typically will be assigned to one IM server in the IM server network 6902 and to one alert multiplexor in the alert multiplexor network 6908 based on one or more hashing techniques. In one implementation, for example, each IM server in the IM server network 6902 may be dedicated to serving a particular set of registered subscribers. Because all of the IM servers can communicate with each other, all subscribers can communicate with each other through instant messaging. However, the IM servers and the alert multiplexors are capable of storing subscriber information and other electronic content that may be accessed by the other IM servers and alert multiplexors. Thus, in another implementation, each alert multiplexor in the alert multiplexor network 6908 may be dedicated to storing information about a particular set or subset of alerts. Because all of the alert multiplexors can communicate with each other, all registered subscribers can receive all types of alerts. This networking arrangement enables the load to be distributed among the various servers in the IM host complex 690 while still enabling a subscriber to communicate, share information, or otherwise interact with other subscribers and servers in the IM host complex 690.

Figure 7:
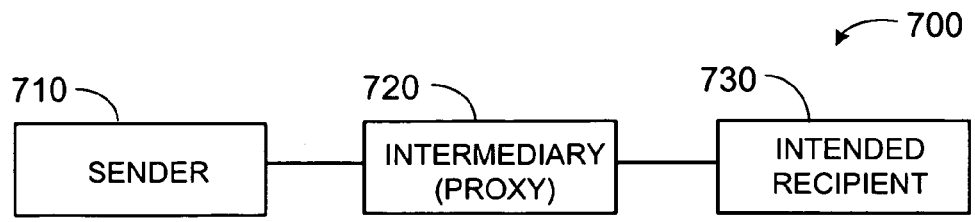
FIG. 7 is an exemplary logical system for performing operations involving the transfer of electronic data.

Referring to FIG. 7, an exemplary logical system 700 for transferring electronic data includes a sender 710 connected through an intermediary 720 (e.g., a proxy server) to an intended recipient 730. The sender 710 and the intended recipient 730 may be any known or described client device, client controller, and/or client system, such as those described in FIGS. 1–6 with respect to items 105, 205, 305, 405, 505, and 605. The intermediary. 720 may be any known or described host device, host controller, and/or host system, such as those described in FIGS. 1–6 with respect to items 110, 210, 310, 410, 510, and 610. Intermediary 720 is generally located at a central location and may be podded. Intermediary 720 typically interfaces more than one sender 710. The sender 710, the intermediary 720, and/or the intended recipient 730 may include any known or described network. As such, the sender 710, the intermediary 720, and the intended recipient 730 may be configured and arranged as described with respect to corresponding devices, systems, and networks of FIGS. 1–6.

Figure 8:
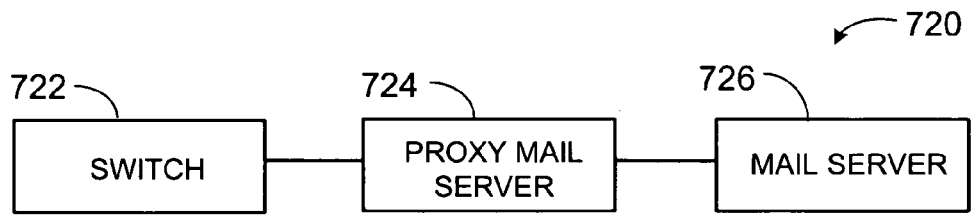
FIG. 8 is an expansion of the intermediary of FIG. 7.

Referring to FIG. 8, exemplary features of the intermediary 720 include a switch 722 connected through a proxy mail server 724 to a mail server 726. The switch may be any known device or controller capable of diverting electronic content. The proxy mail server 724 and/or the mail server 726 may be any type of device or controller capable of functioning as described below.

Figure 9:
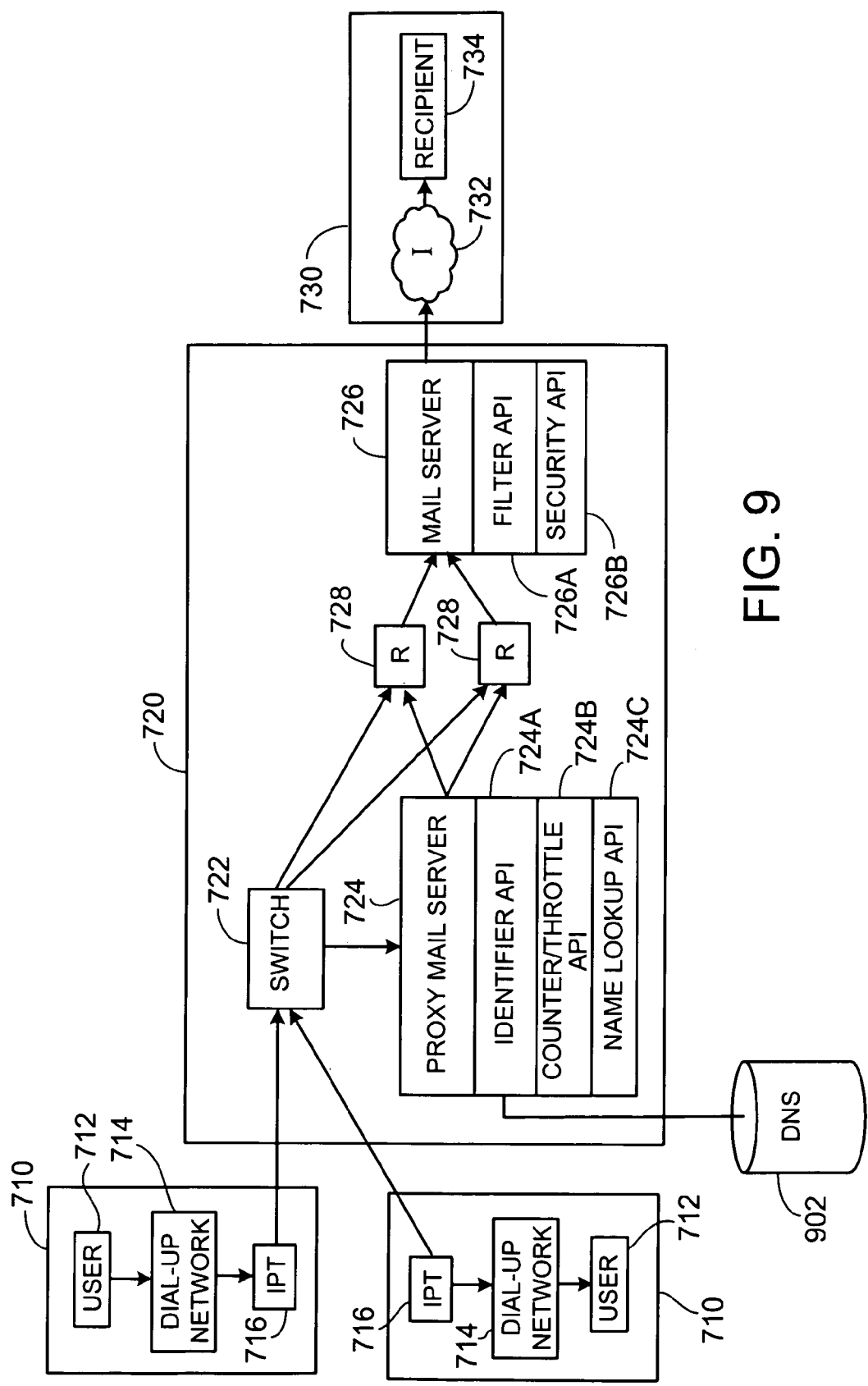
FIG. 9 is an expansion of the logical system of FIG. 7 and the intermediary of FIG. 8.

FIG. 9 illustrates exemplary physical components corresponding to the logical system 700 of FIG. 7, including a more detailed description of the components of the intermediary 720 of FIG. 8.

As shown in FIG. 9, the sender 710 may include a user 712 connected through a dial-up network 714 to an IP tunnel 716. The user 712 may be any known or described client device and/or client controller. The dial-up network 714 may be any known or described network. The IP tunnel 716 may be any known or described IP tunnel, web tunnel, and/or web proxy.

The intermediary 720 includes the switch 722 for diverting electronic data to a proxy mail server 724. The switch 722 runs redirection software (e.g., Layer 4 redirection software) that enables the switch 722 to examine a data packet and to redirect the data packet to a particular server based on one or more attributes of the data packet. In one implementation, the switch 722 is configured to divert all traffic sent on a particular port (e.g., port 25 for mail) to a proxy server (e.g., proxy mail server 724). The proxy mail server 724 includes an identifier application program interface (API 724A, a counter/throttle API 724B, and a name look-up API 724C.

The identifier API 724A is configured to identify the sender 710 by, for example, identifying the sender's internet protocol (IP) address. In one implementation, the identifier API 724A is configured to identify the IP address from the connection established between the sender 710 and the intermediary 720. The identifier API 724A of the proxy mail server 724 may connect to a membership database (e.g., a domain name server (DNS)) 902 that is capable of translating domain names into IP addresses and vice versa. However, other methods of identifying the IP address or identity of the sender 710 are also readily available.

The counter/throttle API 724B is configured to monitor the number of times a particular sender 710 has connected to the proxy mail server 724. The counter/throttle API 724B may be configured to increment a counter as new connections are attempted or established and to decrement the counter as existing connections are dropped. In one implementation, the counter/throttle API 724B prevents the establishing of additional connections above a certain threshold number, which may be configurable. In other implementations, the counter/throttle API 724B may prevent connections exceeding a certain threshold from sending mail or may alternatively send information to another entity (e.g., a system manager) concerning connections by or messages from senders that would exceed the threshold number. The counter/throttle API 724B may take rate into consideration by discounting or crediting connection attempts made before a fixed or configureable time has passed, or by judging sender activity based on temporal considerations.

The name lookup API 724C is configured to identify the screen name of the sender 710 and to tag mail sent by the sender 710. In one implementation, the name lookup API 724C identifies the screen name of the sender 710 from the sender's IP address, and tags mail sent by the sender 710 with the sender's screen name.

In one implementation, an IP address of the sender is identified, a corresponding screen name is determined based on the identified IP address using a DNS service at a local or remote database, and the screen name identifier is appended to the electronic data being sent (e.g., "x apparently from <screenname>"). The screenname identifier may or may not be removed later, as it may be useful for authentication by recipients and may be helpful in identifying system abusers.

The proxy mail server 724 is connected to one or more routers 728. The routers 728 are connected to a mail server 726 and direct mail from the proxy mail server 724 to the mail server 726. The mail server 726 includes a filter API 726A and a security API 726B. The filter API 726A is configured to discard mail according to various criteria, including the identifiers appended to mail received by mail server 726. The security API 726B is configured to track subscribers that are sending spam based on the identifiers appended to the mail, and to affect the accounts of such subscribers.

The intended recipient 730 includes a recipient 734 connected through the Internet 732 to the intermediary 720. The recipient 734 may be any known or described client device or client controller. The Internet 732 may be the public Internet, the World Wide Web, or any other network system, such as networks 160, 260, 360, 460, 560 and 660.

Figure 10A:
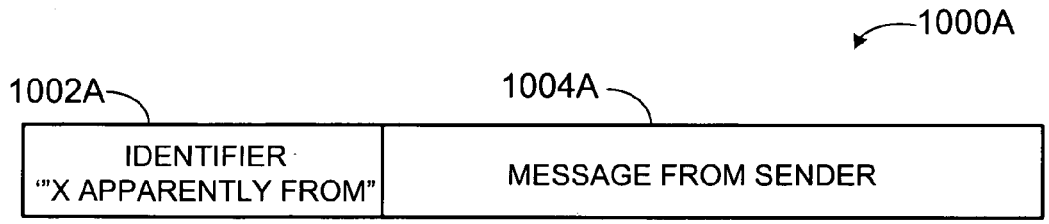
FIGS. 10A and 10B illustrate electronic data units.

Referring to FIG. 10A, an exemplary electronic data unit 1000A includes an identifier 1002A appended to a sender message 1004A. In one implementation, the identifier 1002A is a tag (e.g., "apparently from X", where X is the screen name of the sender 710), and the message 1004A is the original message (e.g., e-mail) from the sender 710. The identifier 1002A may be appended to the front of the electronic data message 1004A, as shown, or it may be appended to the end of the electronic data message 1004A. The identifier also may be added to the electronic content of the message so as to prevent distortion or manipulation of the identifier. In this manner, confidence can be placed in the veracity of the identifier appended to an electronic data message.

Figure 10B:
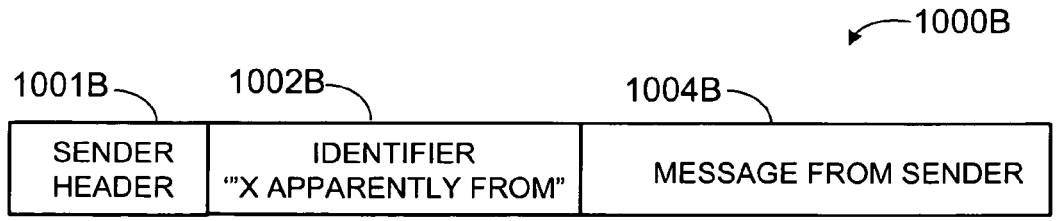

Similarly, as shown by FIG. 10B, for example, an exemplary electronic data unit 1000B may include an identifier 1002B inserted into a sender message 1004B and the sender header 1001B.

Figure 11:
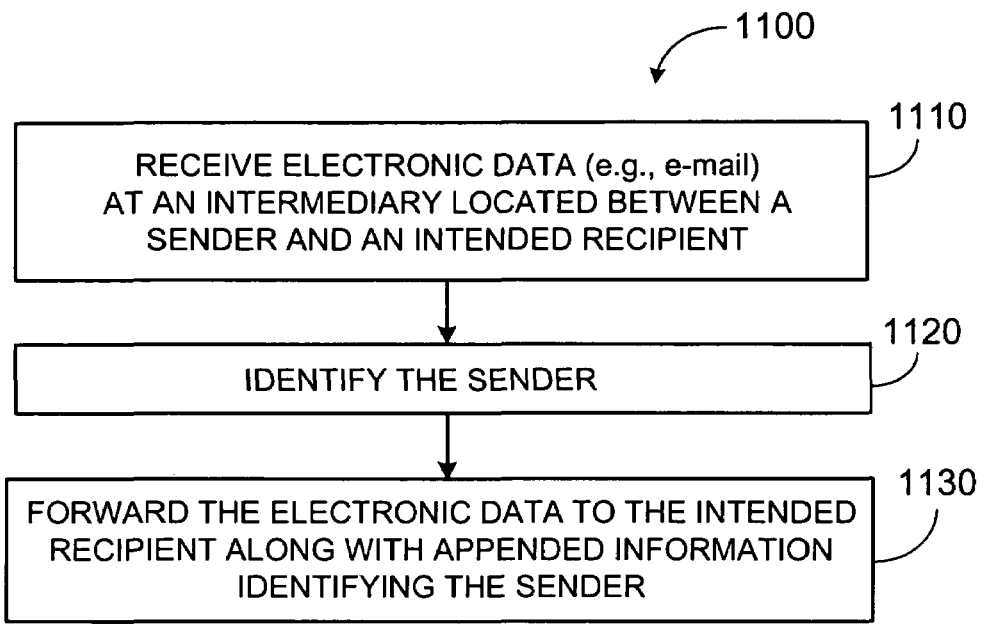
FIG. 11 is a method for communicating electronic data.

Referring to FIG. 11, an exemplary process 1100 may be performed by an intermediary (e.g., intermediary 720). The intermediary 720 receives electronic data communicated from a sender 710 to an intended recipient 730 (step 1110). The electronic data may be, for example, an e-mail or a search request. Based on the electronic data received, the intermediary 720 identifies the sender 710 (step 1120), as described, for example, with respect to FIG. 12. The intermediary 720 then appends information identifying the sender 710 and forwards the electronic data to the intended recipient 730 along with appended information identifying the sender 710 (step 1130), as described, for example, with respect to FIG. 13.

Figure 12:
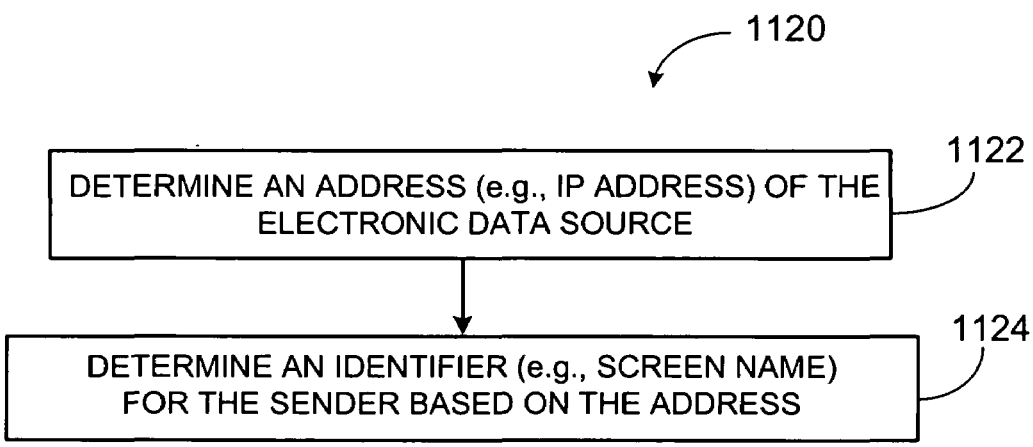
FIG. 12 is a process for identifying the sender of electronic data.

Referring to FIG. 12, an exemplary process for identifying the sender of electronic data (step 1120 of FIG. 11) is performed by determining an address of the electronic data source (step 1122), and then determining an identifier for the sender based on the address (step 1124). The address of the electronic data source may be, for example, an IP address. The address also may be some other identifying criterion or information (e.g., the name of the server or the sending machine). The address may be determined through header information provided along with the electronic data, whether inserted by the sender or by some protocol-driven application. The address also may be determined based on handshaking and other protocols used for standard communications (e.g., Level III packet transfer). The identifier may be, for example, the screen name of the sender or the IP address of the machine from which the message was generated or sent.

Figure 13:
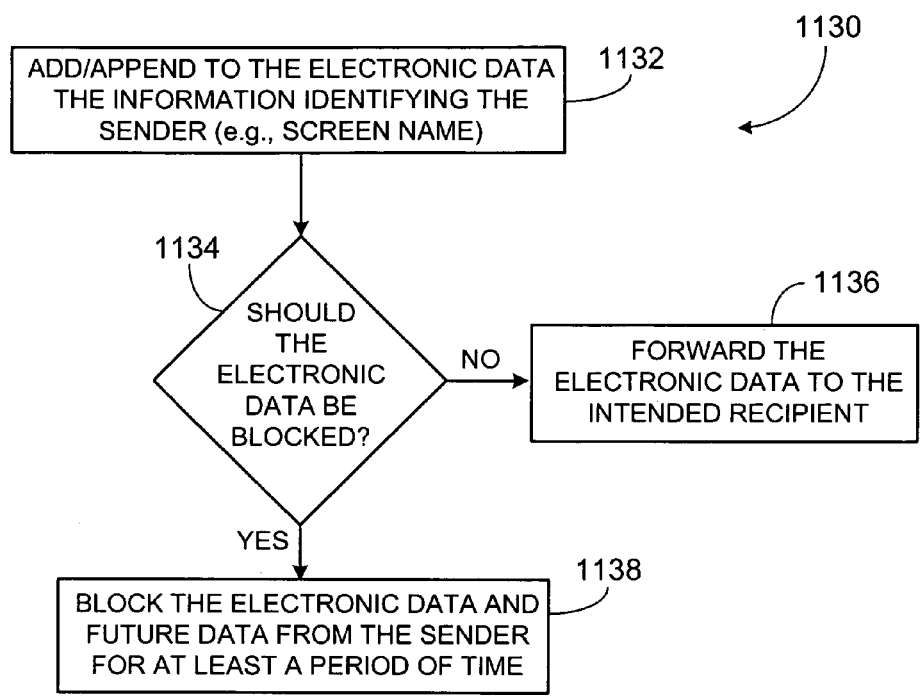
FIG. 13 is a process for forwarding electronic data.

Referring to FIG. 13, an exemplary process for appending identifying information to electronic data and forwarding that electronic data (step 1130 of FIG. 11) includes having the intermediary 720 change the electronic data to reflect information identifying the sender 710 (step 1132). For instance, identifier information may be added or appended to transform the electronic data into an electronic data unit such as that described with respect to FIG. 10. The intermediary 720 determines whether the electronic data should be blocked based on the identifier information (step 1134), as will be described with respect to FIG. 14. If it is not necessary to block the electronic data, the intermediary 720 forwards the electronic data to the intended recipient (step 1136). If the intermediary 720 determines that the electronic data should be blocked, the intermediary blocks the electronic data and may also block future data received from the sender 710 for a configurable period of time (step 1138).

Figure 14:
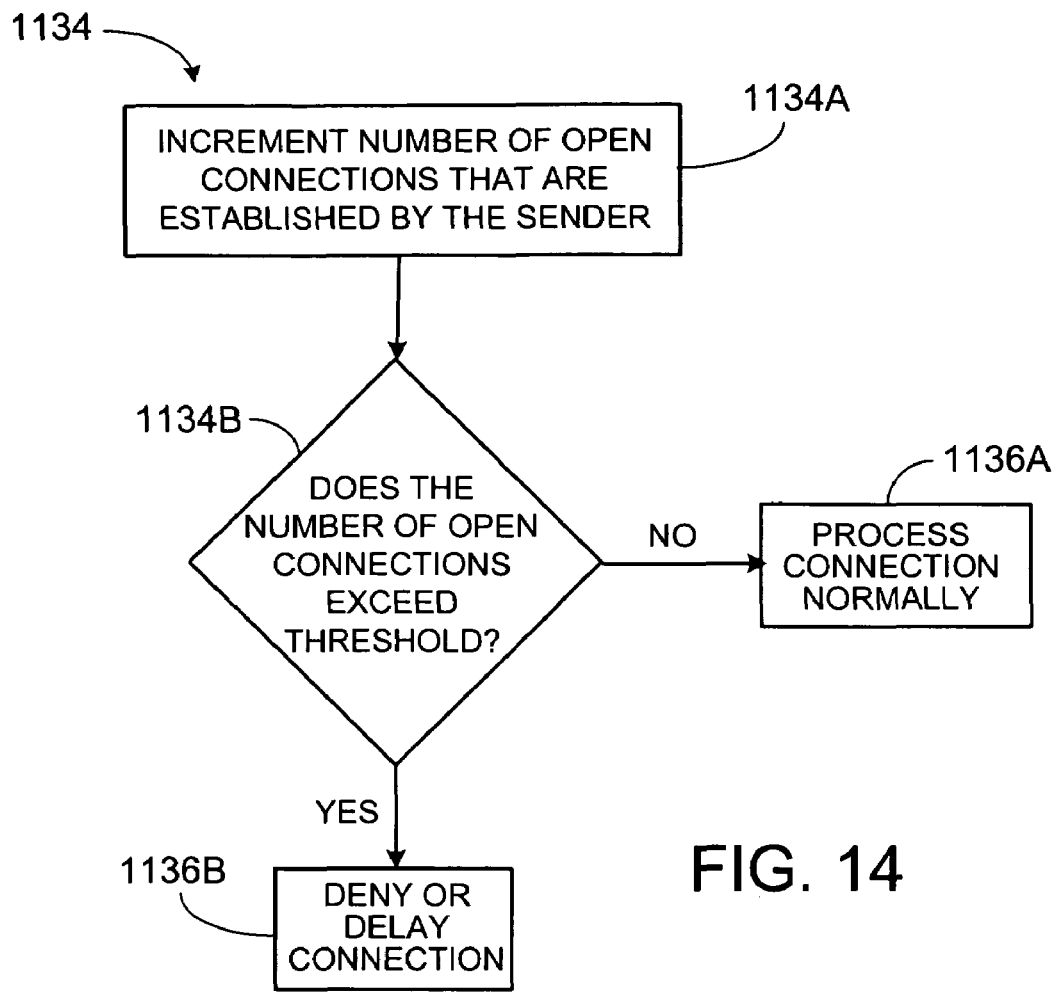
FIG. 14 is a process for determining whether electronic data should be blocked.

FIG. 14 illustrates an exemplary process 1134 for determining whether to block electronic data based on identifier information appended thereto. Based on the identifier information corresponding to the electronic data and identifier information corresponding to past electronic data, the intermediary 720 detects and counts the number of connections established by the sender 710. For instance, the intermediary 720 may increment a counter corresponding to the number of open connections established by the sender as each new connection is detected (step 1134A), and may check whether the number of open connections exceeds a threshold (step 1134B). If the number of open connections does not exceed the threshold, new connections may be established. If the number of open connections exceeds the threshold, no new connections may be established and/or existing connections may be terminated.

Other processes are also available for deciding whether to block electronic data based on appended source identifiers. For instance, electronic data may be blocked by merely comparing the identifier information appended to the electronic data against some stored data or listing of identifiers to be blocked.

While the techniques are described above in conjunction with stopping junk e-mail, these techniques may be effective for other purposes. For instance, the described techniques may be used to stop spam postings to newsgroups.

Figure 15:
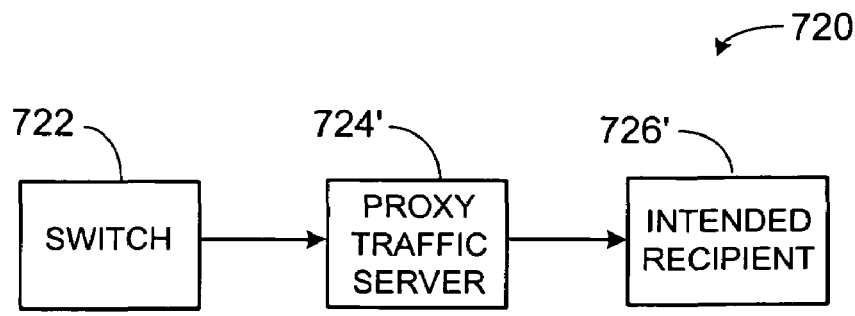
FIG. 15 is a logical system for communicating electronic data relating to news.

Referring to FIG. 15, an intermediary 720 for communicating electronic data relating to news includes a switch 722 connected through a proxy traffic server 724' to a news server 726'. The switch 722 may be any device or controller capable of diverting electronic content. The proxy traffic server 724' and the news server 726' may be any device or controller as described herein. In one implementation, the switch 722 diverts newsgroup content intended for a news server 726' to the proxy traffic server 724'. The proxy traffic server 724' may perform filtering (e.g., based on number of specified recipients and/or news content) and/or may terminate connections to throttle mass postings to newsgroups using processes similar to those described with respect to FIGS. 11–14. In such a system and method, traffic on port 119 (news postings) may be proxied.

Furthermore, although specific implementations are described above, other implementations are within the scope of the following claims.

What is claimed is:

1. A method of inhibiting a subscriber's ability to communicate electronic messages:
   accessing indicia of multiple electronic messages sent by one or more subscribers during a period of time, each electronic message including a header and including a content portion readable by a human;
   counting the number of electronic messages that are sent by a subscriber during the period of time;
   determining, based on results obtained when counting, whether more than a threshold number of electronic messages are sent by the subscriber during the period of time;
   inhibiting the subscriber's ability to communicate electronic messages conditioned on whether more than the threshold number of electronic messages is sent by the subscriber during the period of time;
   determining that the subscriber is sending SPAM based on results obtained when counting; and
   tracking the subscriber, as a result of determining that the subscriber is sending SPAM.

2. The method of claim 1 wherein counting the number of electronic messages that are sent by a subscriber comprises identifying messages sent by the subscriber using an identifier of the subscriber.

3. The method of claim 2 wherein identifying messages using an identifier comprises identifying messages using a screen name of the subscriber.

4. The method of claim 1 wherein inhibiting the subscriber's ability to communicate electronic messages comprises affecting an account of the subscriber.

5. The method of claim 1 wherein inhibiting the subscriber's ability to communicate electronic messages comprises preventing the subscriber from sending more electronic messages.

6. The method of claim 1 wherein inhibiting the subscriber's ability to communicate electronic messages comprises terminating one or more electronic messages currently being sent.

7. The method of claim 1 wherein inhibiting the subscriber's ability to communicate electronic messages comprises delaying the subscriber from sending an electronic message to a recipient.

8. The method of claim 1 wherein inhibiting the subscriber's ability to communicate electronic messages comprises inhibiting the subscriber's ability to communicate electronic messages for a configurable period of time.

9. The method of claim 1 wherein accessing comprises accessing one or more of an email message, an instant message, and a text message.

10. The method of claim 1 wherein determining whether more than the threshold number of electronic messages are sent by the subscriber during the period of time comprises determining a number of the electronic messages that are sent by the subscriber during the period of time and comparing the number to the threshold number.

11. The method of claim 1 wherein accessing comprises accessing at least one electronic message having a first intended recipient and at least one electronic message having a second intended recipient that is different from the first intended recipient.

12. A computer readable storage medium having embodied thereon a computer program for inhibiting a subscriber's ability to communicate electronic messages, the computer program comprising:
an accessing code segment for accessing indicia of multiple electronic messages sent by one or more subscribers during a period of time, each electronic message including a header and including a content portion readable by a human;
a counting code segment for counting the number of electronic messages that are sent by a subscriber during the period of time;
a threshold determining code segment for determining, based on results obtained when counting, whether more than a threshold number of electronic messages are sent by the subscriber during the period of time;
an inhibiting code segment for inhibiting the subscriber's ability to communicate electronic messages conditioned on whether more than the threshold number of electronic messages is sent by the subscriber during the period of time;
a code segment for determining that the subscriber is sending SPAM based on results obtained when counting; and
a code segment for tracking the subscriber, as a result of determining that the subscriber is sending SPAM.

13. The computer readable storage medium of claim 12 wherein:
the counting code segment is further configured to identify, using a screen name of the subscriber, messages sent by the subscriber, and
the inhibiting code segment is configured to inhibit the subscriber's ability to communicate electronic messages by affecting an account of the subscriber.

14. A method of inhibiting a messaging capability, the method comprising:
accessing indicia of electronic messages received from multiple machines during a period of time, each electronic message including a header and including a content portion readable by a human;
determining a number of messages received, cumulatively from the multiple machines, during the period of time;
determining, based on results obtained when determining a number of messages received, whether more than a threshold number of electronic messages are received, cumulatively from the multiple machines, during the period of time;
determining that SPAM is being received from one or more of the multiple machines based on the determination of whether more than the threshold number of electronic messages are received, cumulatively from the multiple machines, during the period of time;
tracking the one or more of the multiple machines based on the determination that SPAM is being received; and
inhibiting a messaging capability conditioned on whether more than the threshold number of electronic messages is received, cumulatively from the multiple machines, during the period of time.

15. The method of claim 14 wherein inhibiting a messaging capability comprises inhibiting a messaging capability of one or more of the multiple machines.

16. The method of claim 14 further comprising determining multiple identifiers, such that the multiple identifiers include a separate identifier for each of the multiple machines, and each of the separate identifiers includes a screen name of a subscriber.

17. The method of claim 16 wherein the screen names are all distinct.

18. The method of claim 14 wherein:
accessing indicia of electronic messages received from multiple machines comprises accessing indicia of electronic messages received from more than one online identity,
determining a number of messages received comprises determining a number of messages received cumulatively from the more than one online identities, and
determining whether more than a threshold number of electronic messages are received comprises determining whether more than the threshold number of electronic messages are received cumulatively from the more than one online identities.

19. The method of claim 18 wherein inhibiting a messaging capability comprises inhibiting a messaging capability of one or more of the more than one online identities.

20. A computer readable storage medium having embodied thereon a computer program for inhibiting an ability to communicate electronic messages, the computer program comprising:
an accessing code segment for accessing indicia of electronic messages received from multiple machines during a period of time, each electronic message including a header and including a content portion readable by a human;
a number determining code segment for determining a number of messages received, cumulatively from the multiple machines, during the period of time;
a thresholding code segment for determining, based on results obtained when determining a number of messages received, whether more than a threshold number of electronic messages are received, cumulatively from the multiple machines, during the period of time;
a code segment for determining that SPAM is being received from one or more of the multiple machines based on a determination of whether more than the threshold number of electronic messages are received, cumulatively from the multiple machines, during the period of time;
a code segment for tracking the one or more of the multiple machines based on a determination that SPAM is being received; and
an inhibiting code segment for inhibiting a messaging capability conditioned on whether more than the threshold number of electronic messages is received, cumulatively from the multiple machines, during the period of time.

21. The computer readable storage medium of claim 20 further comprising an identifier determining code segment for determining multiple identifiers, such that the multiple identifiers include a separate identifier for each of the multiple machines, and each of the separate identifiers includes a screen name of a subscriber.

* * * * *